(12) United States Patent
Pilger (10) Patent No.: US 6,231,435 B1
(45) Date of Patent: May 15, 2001

(54) ELECTRONIC METHOD AND SYSTEM FOR TRACKING THE CARCASS OF A SLAUGHTERED ANIMAL THROUGH A PROCESSING PLANT

(76) Inventor: John Pilger, P.O. Box 1809, Los Gatos, CA (US) 95031

( * ) Notice: Subject to any disclaimer, the term of this patent is extended or adjusted under 35 U.S.C. 154(b) by 0 days.

(21) Appl. No.: 09/492,965

(22) Filed: Jan. 28, 2000

(51) Int. Cl.[7] ........................................ A22B 5/00
(52) U.S. Cl. ............................ 452/157; 452/158
(58) Field of Search ........................... 452/157, 150, 452/158, 198

(56) References Cited

U.S. PATENT DOCUMENTS 4,597,495 * 7/1986 Knosby .................................. 452/157
5,478,990 * 12/1995 Montanari et al. .................. 235/375
5,781,112 * 7/1998 Shymko et al. ...................... 340/522
5,964,656 * 10/1999 Lawler, Jr. et al. ................. 452/173

* cited by examiner

Primary Examiner—Willis Little
(74) Attorney, Agent, or Firm—Rick B. Yeager (57) ABSTRACT

An efficient integrated electronic method and system apparatus for tracking the carcass of a slaughtered animal through a processing plant so that quality assurance source verification data and performance tracking are provided for individual animals throughout the production cycle. The preferred embodiment includes a trolley, a unique trolley code, a hole pattern vision recognition system with an integrated data logger, an industrial tag reader, a unique animal code, an electronic identification transponder, an electronic identification transponder reader, an electronic identification transponder reader antenna, a reclamation barrel and a plastic funnel.

9 Claims, 6 Drawing Sheets

ELECTRONIC METHOD AND SYSTEM FOR TRACKING THE CARCASS OF A SLAUGHTERED ANIMAL THROUGH A PROCESSING PLANT

CROSS-REFERENCE TO RELATED APPLICATIONS

This application is related to application Ser. No. 09/036,564, filed Mar. 9, 1998, entitled "Method and Apparatus for a Livestock Data Collection and Management System". That application is pending before the Patent and Trademark Office at the time of the filing of this application.

BACKGROUND—Field of Invention

The present invention relates to an integrated electronic method and system for tracking the carcass of a slaughtered animal throughout its movement—usually by trolley—through a processing line, by correlating a specific trolley to a specific carcass of a slaughtered animal, such that a particular animal history can provide both quality assurance source verification and performance tracking.

There is a need, for both economic and quality assurance reasons, for an efficient and cost-effective method for identifying and tracking livestock, and for the monitoring of the processing of those livestock. Throughout the livestock production and processing cycle, there is a need for more detailed information so that ranchers, stockmen, feedlots, packers, distributors and retailers can make informed decisions about factors and variables such as genetics, herd management, purchasing, feed strategies, and ship dates. Producers who improve their animal performance can realize greater returns with performance-based compensation when accurate information about the history and the value of each animal is easily available.

There is also a growing concern about quality assurance in the livestock processing cycle; there is an opportunity for producers and processors who can establish that quality assurance to improve their compensation. Effective quality assurance programs such as HACCP, or Hazards Analysis and Critical Control Points, programs require accurate and timely information about the history of each animal.

The Beef Industry

The beef industry is a good example of the livestock industry. Traditionally, there are four segments to the U.S. beef industry: the cow/calf producer, the stockman, the feedlot, and the packer/slaughter facility.

The slaughter facility phase is most important for the present invention. An object of the present invention is to track the animal throughout this phase of the cycle. The slaughter facility or packer typically slaughters the animal and then chills, ages and cuts the carcass into the various cuts of meat and packs those cuts for shipment to distributors and retailers. The packer also provides grade and yield ratings for the carcass. Important quality factors include the live animal weight, the carcass weight, a chilled weight; and the yield, grade, and quality of the carcass and carcass defects. The information collected by the packer is important to all of the upstream participants, such as producers, stockmen and feedlots, because it allows them to adjust their management practices based on the actual quality and economic result for each animal. The upstream data, such as genetic factors, and the environmental factors, such as health and drug treatments, nutrition, and growth history, is important to the packer because it permits the packer to select animals that produce the results desired by his customers.

Typically, each of the four segments of the livestock production and processing cycle, i.e., the cow/calf producer, the stockman, the feedlot, and the packer/slaughter facility, have attempted to optimize their own operations, and there has been relatively little emphasis on cooperative optimization efforts. There is a growing recognition across these industry segments, however, that for both quality assurance reasons and for the improvement of the industry in general, it is desirable to attempt improved data collection and data management. An object of the present invention is to provide that improved data collection and data management.

Variability and Quality Control

There is variability in individual animal production efficiency and in individual carcass quality characteristics such as weight, frame size, muscling, fat content, marbling, and feed efficiency. This variation is due to a combination of genetic factors and environmental factors such as health and drug treatments, nutrition, and growth history. Many of the genetic and environmental factors can be controlled or managed to improve both quality and economic return on investment if accurate historical information were available throughout the production cycle.

The livestock industry has recognized that certain livestock species and breeds outperform other species during production and processing. The prior art has used data collection systems and statistical analysis of data related to livestock breeds in order to identify higher performance breeds. There is a need to extend this data collection so that individual producers can make informed decisions about individual breeding animals in order to further improve their herds.

BACKGROUND—Description of Related Art Including Information Disclosed Under 37 CFR 1.97 and 37 CFR 1.98

Trolley Identification to Animal Identification Correlation Systems

Most slaughter plants employ trolley identification systems as a way of tracking a particular producer's carcasses passing through the processing line. At times, the tracking involves the carrying of electronic identification transponders in the form of eartags, injectable transponders or boluses. The present invention provides a unique means for correlating specific slaughter plant trolleys to specific carcasses, using a unique identification code for the trolley and a unique identification code for the carcass of the animal riding on that trolley. Three common methods are currently used in trolley identification. Those methods are as follows: (1) bar code labeling; (2) pattern recognition vision systems of two types; and (3) radio frequency identification tags. With each of these prior art methods, the bar code labeling, pattern recognition vision, and frequency identification tags are typically affixed to the trolley. While some trolley identification and animal electronic identification systems may already exist, those systems generally require integration with the host computer located on the plant floor of the processing plant.

The present invention is a stand-alone system which does not require integration with the host computer located on the plant floor of the processing plant. Moreover, the present invention uses a formed reader antenna which is integrated into either a reclamation barrel or a plastic funnel, allowing for reading of the electronic identification transponder without additional effort on the part of the individual removing the animal's electronic identification transponder. Also, unlike the current indexing systems being used by plants, if a tag cannot be read or a carcass falls off a hook, the only data that is lost is the data associated with the single animal affected.

An additional objective of the invention is to provide Source Verification by making historical data for the animal available to the packer. This Source Verification will preferably include certified quality control programs such as HACCP plans.

Electronic Identification

Although it is possible to use manual identification methods for livestock and to employ manual data entry methods, it is desirable to automate the identification and data entry in order to reduce expense and to improve accuracy of the data. These devices typically produce either a unique alphanumeric code or a unique decimal code.

Electronic identification devices and systems have provided a good method for providing identification of livestock. Typically, electronic identification systems use a passive electronic identification device that is induced to transmit its identification signal by an externally radiating source. These passive electronic identification devices may be a transponder carried with the individual animal on a collar as illustrated and described in Carroll U.S. Pat. No. 4,475,481, issued Oct. 9, 1984, entitled "Identification System" and in Kuzara U.S. Pat. No. 4,463,353, issued Jul. 31, 1984, entitled "Animal Feeding and Monitoring System"; in an ear tag such as those commercially available from Destron/Fearing, Inc., Allflex U.S.A., Inc. and Avid Marketing, Inc.; in a transponder implanted in the animal as illustrated and described in Pollack U.S. Pat. No. 4,854,328, issued Aug. 8, 1989, entitled "Animal Monitoring Telltale and Information System" and in Hanton U.S. Pat. No. 4,262,632, issued Apr. 21, 1981, entitled "Electronic Livestock Identification System"; or in a bolus such as illustrated and described in U.S. Pat. No. 4,262,632, issued Apr. 12, 1981, entitled "Electronic livestock identification system" by John P. Hanton and Harley A. Leach.

Although electronic identification through radio frequency identification (RFID) tags or barcodes are used in some phases of the livestock production cycle, there is a need to provide a means for individual animal identification throughout the production cycle and to minimize the difficulty of data entry throughout the industry.

Several RFID readers are commercially available, typically from the transponder suppliers, including models from Destron/Fearing, Inc., Allflex U.S.A., Inc. and Avid Marketing, Inc.

The prior art includes RFID readers that can distinguish multiple types of RFID transponders as illustrated and described in U.S. Pat. No. 5,235,326, issued Aug. 10, 1993, "Multi-mode identification system" to Michael L. Beigel, Nathaniel Polish, and Robert E. Malm.

Databases and Management Systems

At different stages of the production cycle, there are different databases which exist for different business purposes. The rancher will typically maintain his own database, a stockman will have an inventory system, a feedlot will have a management database, and a packer will have its own inventory and management system. There is also a trend toward larger marketing alliance or national databases that include some data from each of these industry segments.

U.S. Pat. No. 5,322,034, which issued Jun. 21, 1994 to Richard L. Willham, for a "Livestock record system" describes a method for storing the individual animal's identification and performance data on a programmable electronic identification and data storage module carried with the animal. An object of the present invention is to provide a low-cost per animal system for obtaining and maintaining source verification and performance databases that are independent of the animal.

U.S. Pat. No. 5,315,505 issued to William C. Pratt on May 24, 1994 for a "Method and system for providing animal health histories and tracking inventory of drugs" describes a method and system for providing improved drug treatment to selected animals in a retained group. A computer system is used to provide an operator with the health and drug treatment history of an animal. With this information and a diagnosis of the animal's health condition, a drug treatment is chosen. The diagnosis and treatment are entered into the computer system to update the animal's health and treatment history. An object of the present invention is to provide complete source verification and performance databases for all key livestock events.

U.S. Pat. No. 5,673,647 for a "Cattle management method and system", issued on Oct. 7, 1997 to William C. Pratt, describes an automated method and system for providing individual animal electronic identification, measurement and value based management of cattle in a large cattle feedlot. That method includes individual animal identification, a computer system, and multiple measurements coupled with a cattle handling and sorting system. An object of the Pratt patent was to build a feedlot data base to more accurately identify and measure characteristics such as weight, so that subsequent animals could be produced and fed for more effective value-based selection and management of the animals. In particular, that database related to calculations for economic management of feeding and shipping to permit optimum weight gains and feedlot ship dates. Whereas the feedlot patent disclosed identifying a particular animal on arrival at the feedlot, an object of the present invention is to track individual animals throughout the packer/slaughter facility phase of the production and processing cycle.

SUMMARY OF THE INVENTION

An object of the present invention is to provide an effective data collection and database management methodology in the livestock industry including automated entry for individual animal identification.

Another object of the present invention is to provide a stand-alone correlation system for matching the trolley to the animal which does not require integration with the processing plant's host floor computer. Moreover, an object of the present invention is to create a trolley identification to animal identification correlation system which can be run remotely using a conventional modem or a cellular modem. Finally, another advantage of this system is that, unlike current indexing systems, if an electronic identification transponder cannot be read or a carcass falls off a hook, the only data lost is the data associated with the animal's electronic identification transponder which could not be read or fell off the hook. Components of the system for tracking the carcass of the animal through a processing plant, in the preferred embodiment, include a trolley for moving the animal through the processing plant with the trolley having a unique code, a hole pattern vision recognition system with an integrated data logger for identifying the trolley's code, an industrial tag reader, an electronic identification transponder with a unique code for each animal, an electronic identification transponder reader, a reader antenna for the electronic identification transponder reader, a reclamation barrel for depositing the electronic identification transponder reader, a plastic funnel for embedding the electronic identification transponder reader, and a conventional or cellular modem.

Although the invention is described in the context of beef cattle, it is not so limited. It should be apparent to those skilled in the art that the invention can be modified, without departing from its principles, for other livestock including cattle, swine, sheep, goats, and fowl.

DETAILED DESCRIPTION OF THE INVENTION

The present invention relates to the correlation of a specific trolley to a specific carcass of a slaughtered animal, such that the carcass of the slaughtered animal may be tracked throughout a processing plant. The trolley has a unique trolley code, and the carcass of the slaughtered animal has a unique animal code. These codes are matched and stored as a pair.

Figure 1:
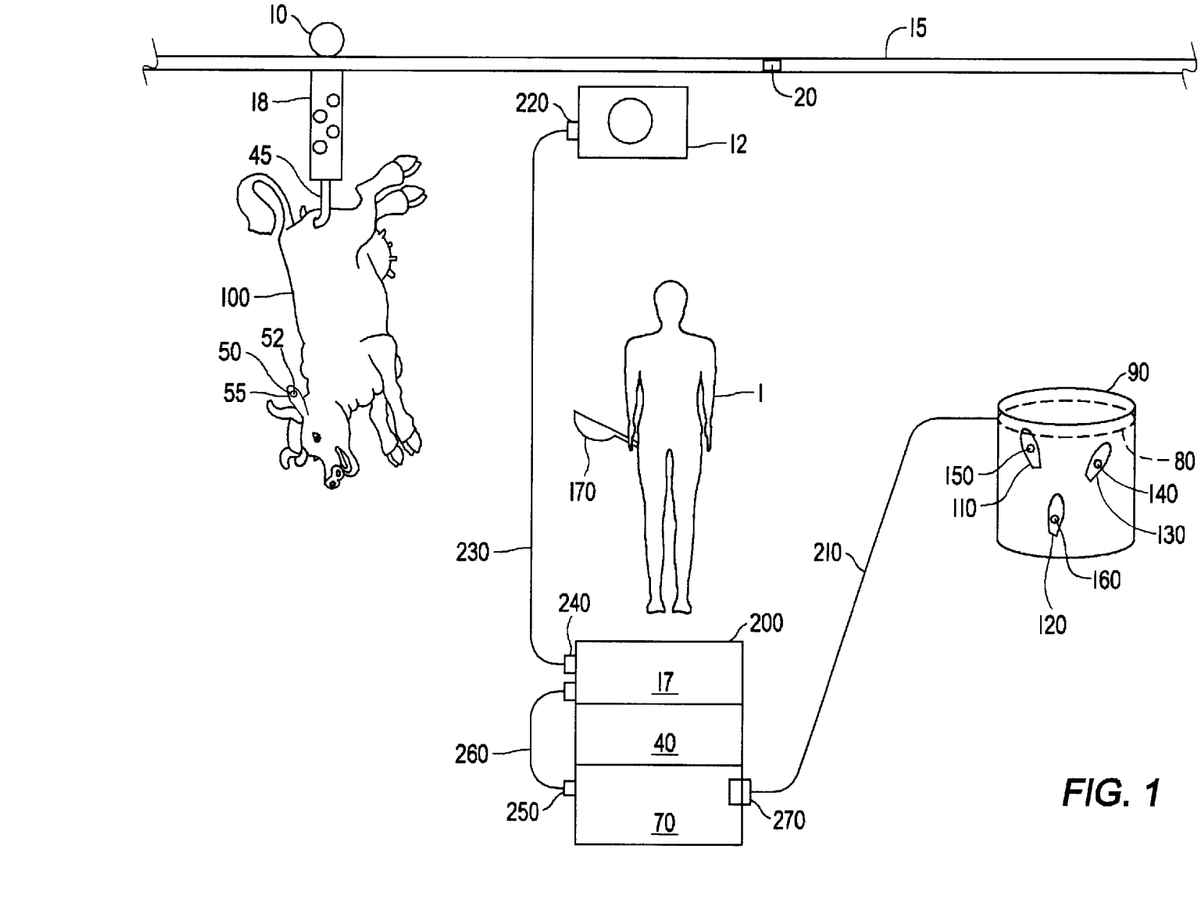
FIG. 1 illustrates a front elevation view of the system for tracking the carcass through a processing plant.

Referring now to FIG. 1, a trolley 10 moves the carcass 100 along a rail 15 through the slaughter facility. The carcass is connected to the trolley by means of a hook 45. The trolley has a unique trolley code 20 for identifying the trolley. An electronic identification transponder 50, when queried by an electronic identification transponder reader 70, produces a unique animal code 52 for the carcass. The electronic identification transponder reader antenna 80, which is located within the inside perimeter of a reclamation barrel 90, picks up the radio frequency signal from each carcass transponder and transmits it to the reader 70 by means of a cable 210 connecting the antenna 80 to the reader 70. The antenna cable is connected to an output port 270 on the reader 70. The reader 70 decodes the signal into a unique animal code 52. The carcass is thereby identified by the unique animal code 52. The transponder in FIG. 1 has been placed through the carcass ear 55. A hole pattern vision recognition system including a camera 12, a hole pattern shackle 18, a decoder and correlator 17, allows the particular trolley's identification to be determined. The trolley identification from the decoder and correlator 17 and the carcass identification from the ear tag decoder 70 are received by a datalogger 40. The datalogger is a very simple computer that resides in the stainless steel housing 200 along with the decoder and correlator 17 and the reader 70. The housing 200 is located at floor level of the processing plant. The reader 70 has a serial (RS-232) output port 250 that is connected to the serial port 260 of the decoder and correlator 17. As the reader 70 reads the electronic identification transponder 50, it communicates the unique code 52 to the computer of the decoder and correlator 17. The computer in the decoder and correlator 17 then takes the unique trolley code 20 and correlates it with the unique code 52 which was provided by the reader 70. A separate computer may be used in lieu of the computer contained in the decoder and correlator 17 to correlate and perform the functions of the datalogger 40. This correlated data may be transported through many mediums, including cabled network, dial up modem or cellular modem. Also illustrated are the detached ears of other carcasses 110, 120 and 130, and transponders within those detached ears of other carcasses 140, 150 and 160.

The hole pattern vision recognition system, which includes the camera 12, the decoder and correlator 17 and the hole pattern shackle 18, detects and identifies the trolley. The decoder and correlator include a computer, a video capture card and a trolley identification display. The camera 12 has a serial or NTSC (composite video) output port 220 that connects to a serial port 240 by means of a serial cable or coax NTSC cable 230. The video capture card located in the computer of the decoder and correlator 17 receives the information from the camera 12. The preferred hole pattern vision recognition system is one manufactured by ASTD (Sioux Center, Iowa), with a pattern recognition which automatically discriminates between hole diameter and hole position, has a carcass cycle time of up to one carcass every ten (10) seconds, and which has an output capability of any one of the following: RS-232, RS-422, RS-485, Ethernet Access Point or cellular modem. This hole pattern vision recognition system is commercially available under the name TROLLEY VISION™.

Figure 2:
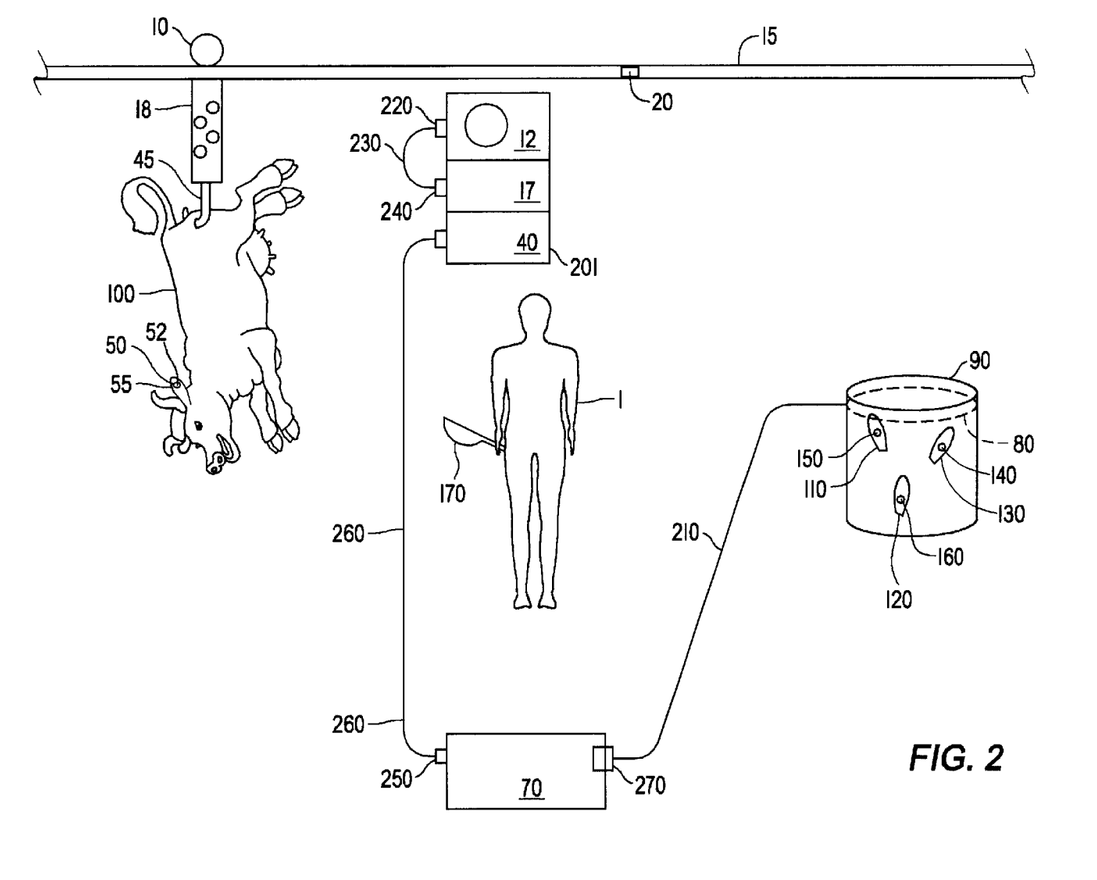
FIG. 2 illustrates a front elevation view of an alternate embodiment of the system for tracking the carcass through a processing plant.

Referring now to FIG. 2, an alternate embodiment for the system of the present invention, the decoder and correlator 17 and the integrated data logger 40 are located near the same level as the rail 15 inside a stainless steel housing 201. The remainder of the elements illustrated in FIG. 2 are generally as described in connection with FIG. 1.

Figure 3:
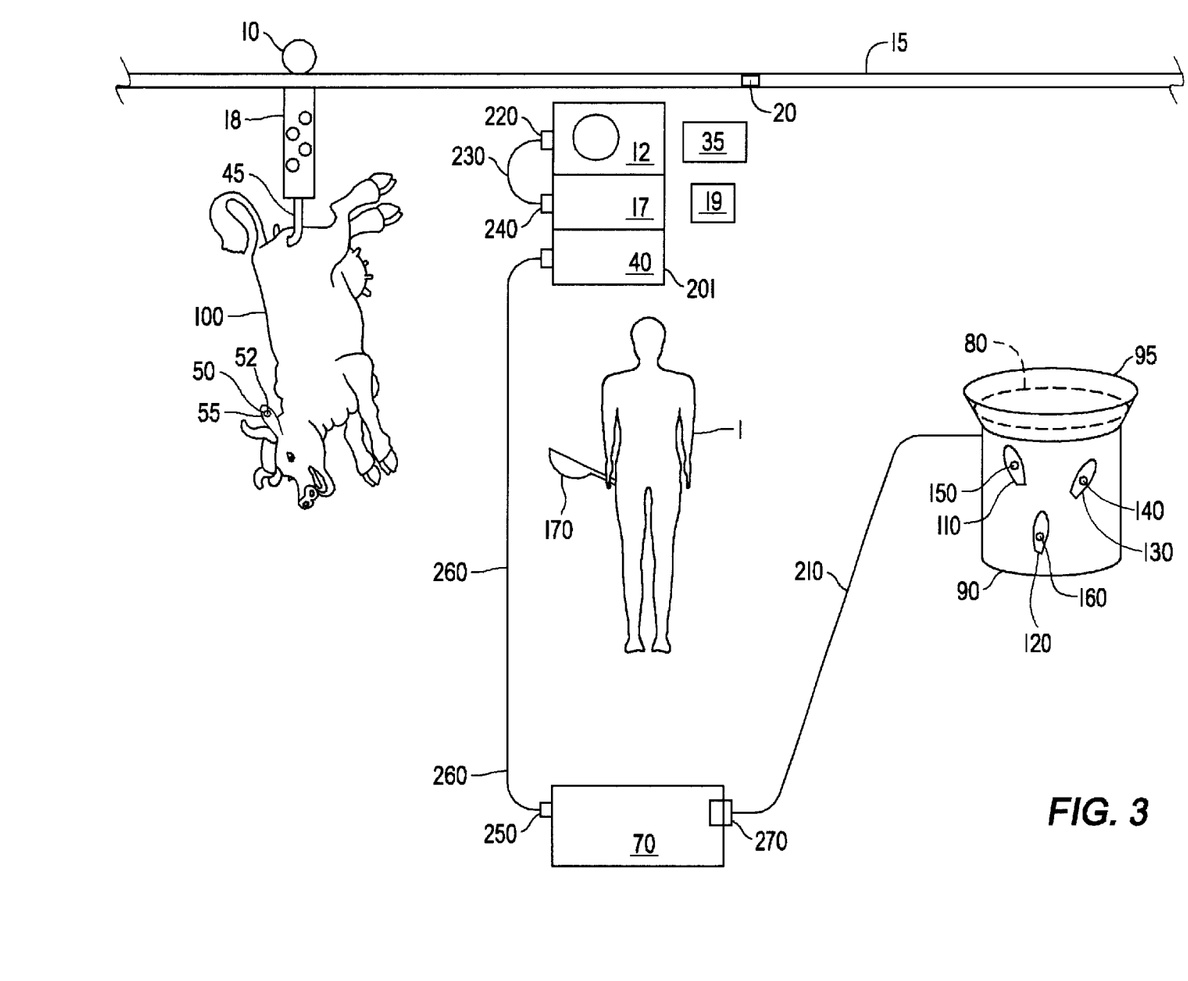
FIG. 3 illustrates a front elevation view of the preferred embodiment of the system for tracking a carcass through a processing plant.

Referring now to FIG. 3, the preferred embodiment for the system of the present invention, the electronic identification transponder reader antenna 80 is located within the inside perimeter of a plastic funnel 95 which is located in the inside perimeter of reclamation barrel 90. Also included in the preferred embodiment is a cellular modem 19, as well as a radio frequency identification industrial tag reader 35, such as a Datalogic RS-427 RFID Industrial Tag Reader. Such a reader reads trolleys using radio frequency identification (RFID) tags to identify the trolley. If the radio frequency identification industrial tag reader is used in addition to the hole pattern vision recognition system, the trolley will be recognized when it is using a radio frequency identification as well as a hole pattern vision recognition system. With the addition of the radio frequency industrial tag reader, the present invention would automatically discriminate between hole pattern protocols and RFID trolley tag systems. Preferably, the decoder and correlator 17 has a dial up or cellular modem for transferring data. The remainder of the elements of the system of the preferred embodiment are the same as those for the embodiment illustrated in FIG. 1.

Figure 4A:
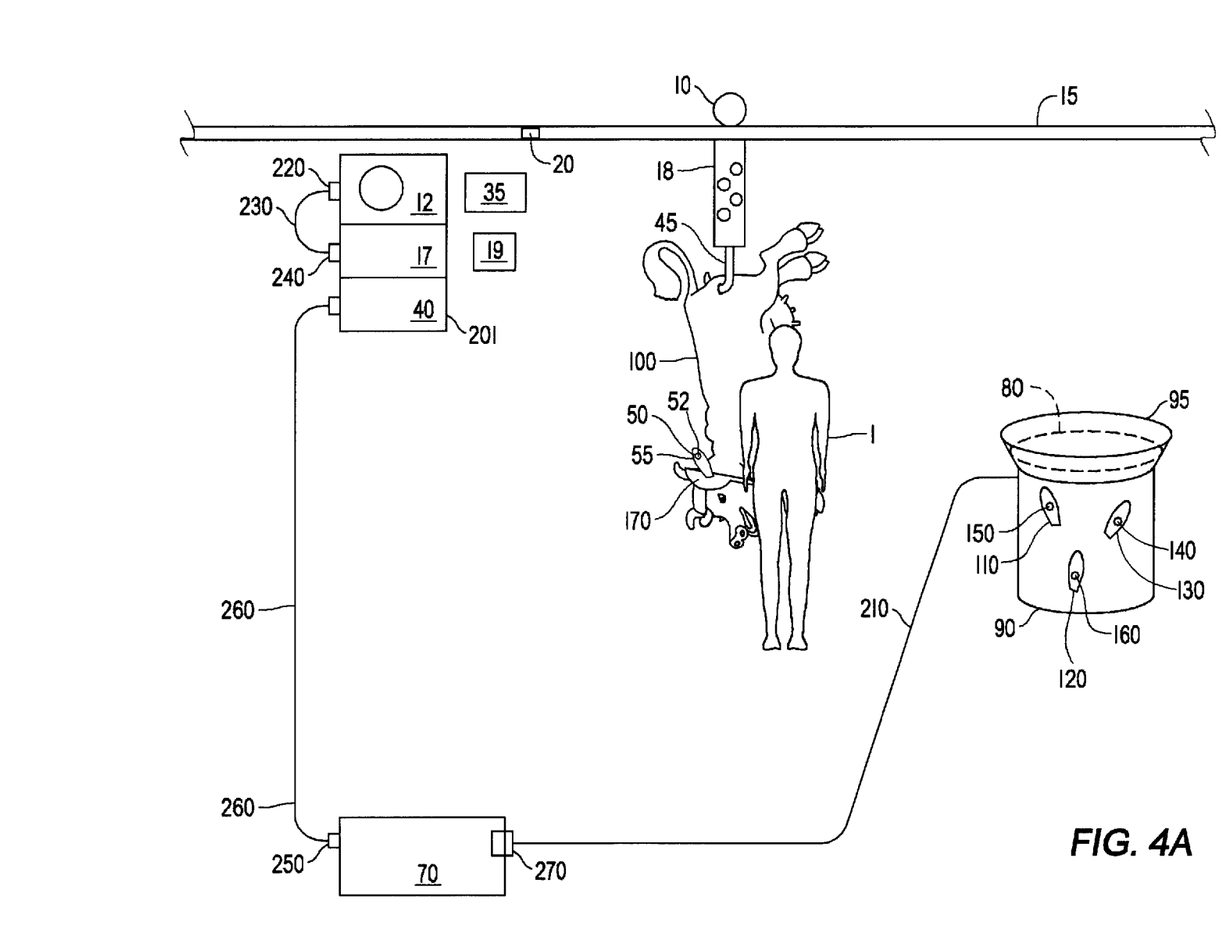
FIGS. 4A through 4C illustrate steps of the preferred methodology for tracking the carcass.
Figure 4B:
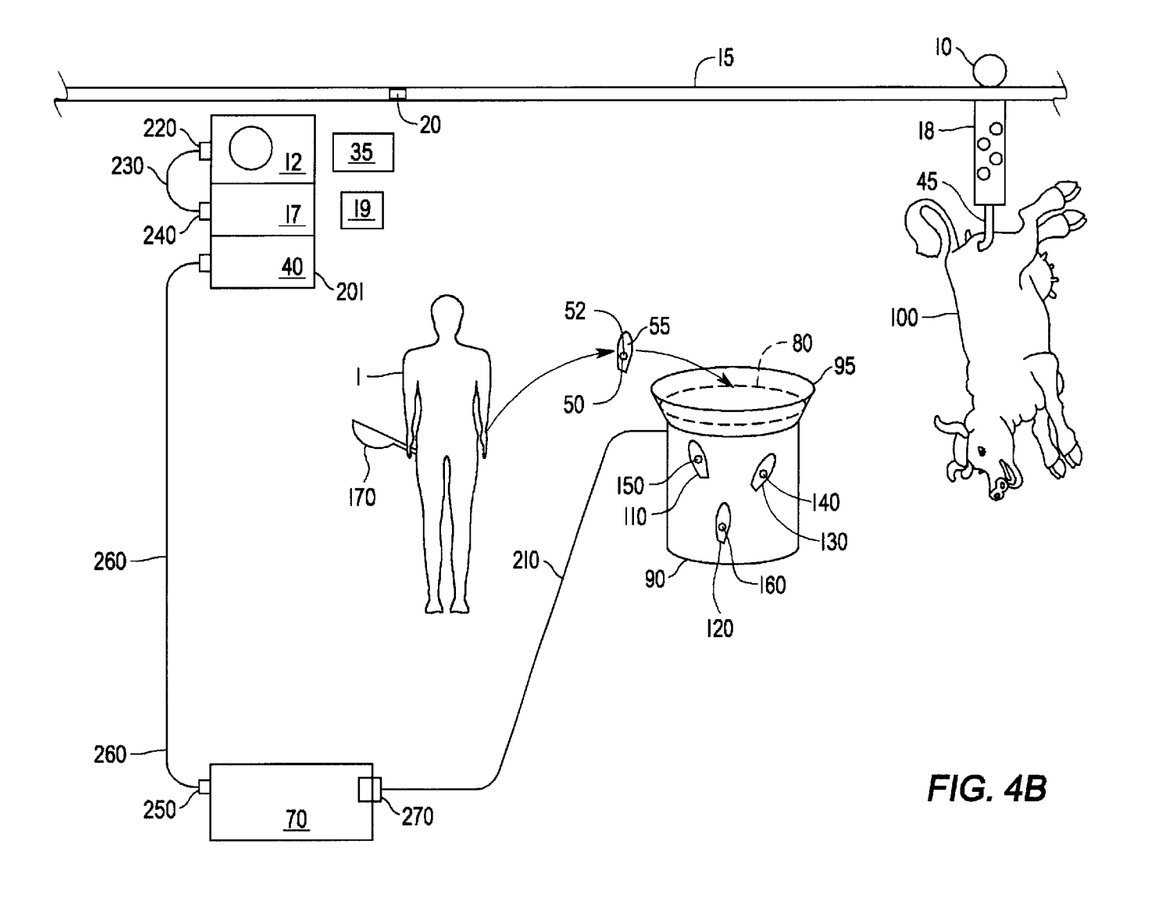

The procedure in many packing plants requires that an individual remove electronic identification transponders, typically in the form of eartags, prior to disassembling the carcass of a slaughtered animal as in FIG. 4A. Typically, as in the present invention, the individual 1 removing the electronic identification transponder 50 drops the electronic identification transponder 50 into a barrel as in FIG. 4B. The electronic identification transponder 50 is generally removed by cutting off the ear 55 of the carcass 100 with a removal tool 170 such as a knife. The transponder is read in FIG. 4C by the electronic identification reader.

Once the electronic identification transponder 50 is removed and dropped into the reclamation barrel 90, the individual 1 waits for the next carcass to arrive and repeats the procedure for each carcass. Preferably, the electronic identification transponder 50 is dropped at a rate of up to ten (10) meters per second. Preferably, the electronic identification transponder reader antenna 80 is integrated around the perimeter of a plastic funnel 95. Alternately, the electronic identification transponder reader antenna and the electronic identification transponder reader may be integrated into the inside perimeter opening of the reclamation barrel as in FIG. 1. When the electronic identification transponder reader antenna is integrated with either the perimeter of a plastic funnel or the inside perimeter opening of a reclamation barrel, the electronic identification transponder can be read as it is dropped by the individual into the barrel without additional effort.

Figure 4C:
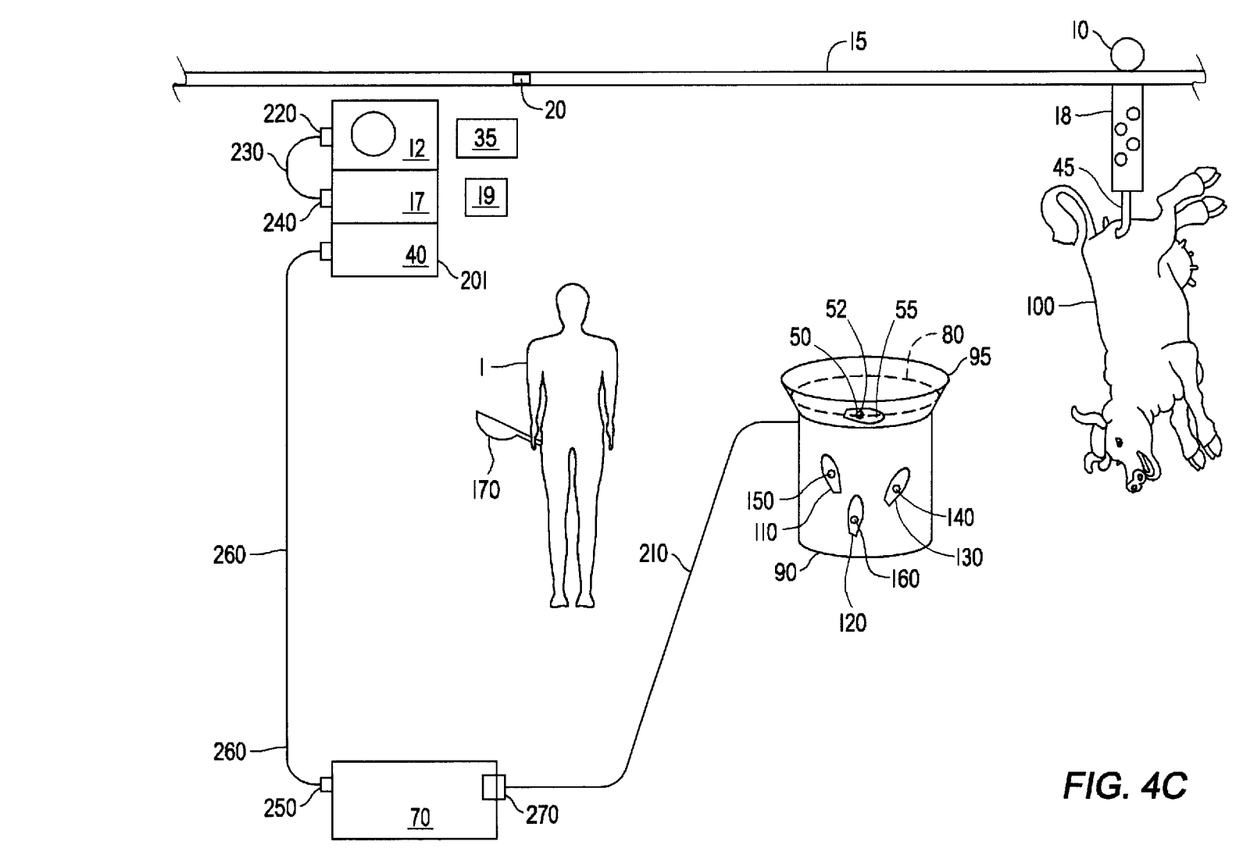

The electronic identification transponder 50 is read using the electronic identification transponder reader 70 and the electronic identification transponder reader antenna 80 as the electronic identification transponder 50 is dropped and the carcass 100 is uniquely identified in FIG. 4C. Electronic identification transponders are typically applied to young animals at the first opportunity to pen and work the animal, such as at initial immunization. In accordance with the present invention, the animal should be identified with the unique animal code assigned to such animal and its electronic identification transponder at some point prior to, or upon, its entry into the assembly line of the processing plant. In the preferred embodiment, the electronic identification transponder reader and electronic identification transponder reader antenna are manufactured by Destron Fearing, with a decode capability of ISO HDX and FDX-B, with a data transmission time of twenty (20) milliseconds after acquisition of the information to be transmitted, such information being the unique code assigned to the animal. The integrated data logger 40 receives from the reader 70 the corresponding unique animal code 52 from the carcass 100 of the slaughtered animal. The unique trolley code and the unique animal code are then stored as a matched pair in the memory of the integrated data logger and the process repeats itself.

If the electronic identification transponder is used to track the animal throughout the production and processing cycle, then the packing plant or slaughter facility may use the animal's identification to record carcass quality data for the animal and thereby compensate the producer or feedlot according to the quality of the carcass of the animal. The data can include overall evaluation of the carcass as well as information about the amount and quality of particular cuts or products derived from the carcass.

The producer benefits both by having the potential to receive a greater return for higher quality livestock, and by obtaining information which will permit more informed decisions on herd management. For instance, bulls or cows that produce calves with good yields and quality will be preferred for retention in the herd over bulls or cows that produce calves with lower yields or lower quality.

What is claimed is:

1. A method for tracking the carcass of a slaughtered animal through a processing plant comprising the steps of:
   identifying a trolley with a hole pattern vision recognition system and an integrated data logger, such that the trolley provides a unique trolley code, and that code identifies a particular trolley;
   identifying a carcass of a slaughtered animal with an electronic identification transponder, such that the electronic identification transponder provides a unique animal code when queried by an electronic identification transponder reader unit, and that unique animal code identifies a particular animal;
   removing the electronic identification transponder from the carcass of said slaughtered animal;
   dropping said electronic identification transponder into a reclamation barrel, the inside perimeter opening of said reclamation barrel having a plastic funnel including a electronic identification transponder reader antenna and an electronic identification transponder reader embedded and formed in a circular loop within said funnel;
   reading the electronic identification transponder using the embedded electronic identification transponder reader antenna and the electronic identification transponder reader;
   uploading the unique animal code from the animal electronic identification transponder reader to the integrated data logger;
   storing the unique trolley code and the unique animal code as a pair.

2. The method of claim 1 comprising the additional step:
   uploading the unique trolley code and the unique animal code from the data logger to a conventional modem.

3. The method of claim 1 comprising the additional step:
   uploading the unique trolley code and the unique animal code from the data logger to a cellular modem.

4. A method for tracking the carcass of a slaughtered animal through a processing plant comprising the steps of:
   identifying a trolley with a hole pattern vision recognition system and an integrated data logger, such that the trolley provides a unique trolley code, and that code identifies a particular trolley;
   identifying a trolley with a radio frequency identification transponder reader unit, such that the trolley provides a unique trolley code, and that code identifies a particular trolley;
   identifying each carcass of a slaughtered animal with an electronic identification transponder, such that the electronic identification transponder provides a unique animal code when queried by an electronic identification transponder reader unit, and that unique animal code identifies a particular animal;
   removing the electronic identification transponder from the carcass of said slaughtered animal;
   dropping said electronic identification transponder into a reclamation barrel, the inside perimeter opening of said reclamation barrel having a plastic funnel including an electronic identification transponder reader antenna and an electronic identification transponder reader embedded and formed in a circular loop within said funnel;
   reading the electronic identification transponder using the embedded circular electronic identification transponder reader antenna and the electronic identification transponder reader;
   uploading the unique animal code from the electronic identification transponder reader to the integrated data logger;
   storing the unique trolley code and the unique animal code as a pair.

5. The method of claim 4 comprising the additional step:
   uploading the unique trolley code and the unique animal code from the data logger to a conventional modem.

6. The method of claim 4 comprising the additional step:
   uploading the unique trolley code and the unique animal code from the data logger to a cellular modem.

7. A method for tracking the carcass of a slaughtered animal through a processing plant comprising the steps of:
   identifying a trolley with a radio frequency identification transponder reader unit, such that the trolley provides a unique trolley code, and that code identifies a particular trolley;
   identifying the carcass of a slaughtered animal with an electronic identification transponder, such that the electronic identification transponder provides a unique animal code when queried by an electronic identification transponder reader unit, and that unique animal code identifies a particular animal;

removing the electronic identification transponder from the carcass of said slaughtered animal;

dropping said electronic identification transponder into a reclamation barrel, the inside perimeter opening of said reclamation barrel having a plastic funnel including an electronic identification transponder reader antenna and an electronic identification transponder reader embedded and formed in a circular loop within said funnel;

reading the electronic identification transponder using the embedded circular electronic identification transponder reader antenna and the electronic identification transponder reader;

uploading the unique animal code from the animal electronic identification transponder reader to the integrated data logger;

storing the unique trolley code and the unique animal code as a pair.

8. The method of claim 7 comprising the additional step:

uploading the unique trolley code and the unique animal code from the data logger to a conventional, modem.

9. The method of claim 7 comprising the additional step:

uploading the unique trolley code and the unique animal code from the data logger to a cellular modem.

* * * * *